United States Patent
Wang et al.

(10) Patent No.: US 12,067,676 B2
(45) Date of Patent: Aug. 20, 2024

(54) CYBERSPACE MAP MODEL CREATION METHOD AND DEVICE

(71) Applicant: TSINGHUA UNIVERSITY, Beijing (CN)

(72) Inventors: Jilong Wang, Beijing (CN); Congcong Miao, Beijing (CN); Shuying Zhuang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 364 days.

(21) Appl. No.: 17/336,329

(22) Filed: Jun. 2, 2021

(65) Prior Publication Data

US 2021/0312709 A1   Oct. 7, 2021

Related U.S. Application Data

(63) Continuation of application No. PCT/CN2019/098874, filed on Aug. 1, 2019.

(30) Foreign Application Priority Data

Dec. 3, 2018   (CN) .......................... 201811467533.5

(51) Int. Cl.
*G06T 17/05* (2011.01)
*G06F 16/29* (2019.01)
*H04L 41/12* (2022.01)

(52) U.S. Cl.
CPC .............. *G06T 17/05* (2013.01); *G06F 16/29* (2019.01); *H04L 41/12* (2013.01)

(58) Field of Classification Search
CPC .......... G06T 17/05; G06F 16/29; H04L 41/12
(Continued)

(56) References Cited

U.S. PATENT DOCUMENTS

| | | | | |
|---|---|---|---|---|
| 2005/0270288 A1* | 12/2005 | Arcas | ...................... | G06T 17/05 |
| | | | | 345/428 |
| 2013/0321458 A1* | 12/2013 | Miserendino | ........... | H04L 41/22 |
| | | | | 345/629 |
| 2015/0236930 A1* | 8/2015 | Gorman | .................. | H04L 43/10 |
| | | | | 709/224 |

FOREIGN PATENT DOCUMENTS

| | | |
|---|---|---|
| CN | 106372264 A | 2/2017 |
| CN | 106980668 A | 7/2017 |
| (Continued) | | |

OTHER PUBLICATIONS

Dainotti, "Lost in Space: Improving Inference of IPV4 Address Space Utilization" (Year 2016), IEEE Journal On Selected Areas in Communications, vol. 34, No. 6, pp. 1862-1876, Jun. 2016.*

(Continued)

*Primary Examiner* — Hai Tao Sun

(57) ABSTRACT

The present disclosure discloses a cyberspace map model creation method, which includes: determining that a coordinate system of a cyberspace map model uses an IP address as a basic vector; mapping the IP address to a two-dimensional coordinate system; determining, by means of orthogonalizing a logical port, a region, a topological structure to the IP address, a three-dimensional coordinate system to describe more fine-grained information of a cyberspace; constructing a scale standard, so as to lay a theoretical foundation for a multi-level and scalable representation of complex and diverse cyberspace resources in the cyberspace map model; and determining a mapping relationship between a cyberspace map and a geographic map to support screen segmentation, so as to perform a comparison drawing of a same cyberspace scenario in different cyberspace maps and geographic maps, and present cyberspace information in many aspects.

10 Claims, 5 Drawing Sheets

(58) Field of Classification Search
USPC .......................................................... 345/419
See application file for complete search history.

(56) References Cited

FOREIGN PATENT DOCUMENTS

| CN | 108023771 A | 5/2018 |
|---|---|---|
| CN | 108881346 A | 11/2018 |
| CN | 109728934 A | 5/2019 |

OTHER PUBLICATIONS

Zhao Ying, Fan Xiaoping, Zhou Fangfang, Wang Fei, and Zhang Jiawan, "A Survey on Network Security Data Visualization", Journal of Computer-Aided Design & Computer Graphics, vol. 26, No. 5, May 2014, pp. 687-697.

Zhang Long, Zhou Yang, Shi Qunshan, Luo Xiangyang, Zhao Haipeng, "Cyberspace Map Tightly Coupled with Geographical Space", Journal of Cyber Security, vol. 3, No. 4, Jul. 2018, pp. 63-72.

Ai Ting-Hua, "Maps Adaptable to Represent Spatial Cognition", Journal of Remote Sensing, vol. 12, No. 2, Mar. 2008, pp. 347-354.

* cited by examiner 10.0.0.0/24

| Geographic Information System Scale | Geographic Information System Annotation information | Cyberspace map model Scale | Cyberspace map model Annotation information |
|---|---|---|---|
| 1,000 kilometers | Country | /20 (N=10) | Autonomous Domain |
| 500 kilometers | Province | /24 (N=12) | Large network (Wide Area Network) |
| 100 kilometers | City | /26 (N=13) | Small network (Metropolitan Area Network) |
| 30 kilometers | County | /28 (N=14) | Subnet (Local Area Network, Internet of Things, organization) |
| 5 meters | Sub-district | /32 (N=16) | IP addresses and attributes (ports, services, links, terminal nodes, etc.) |

FIG. 5

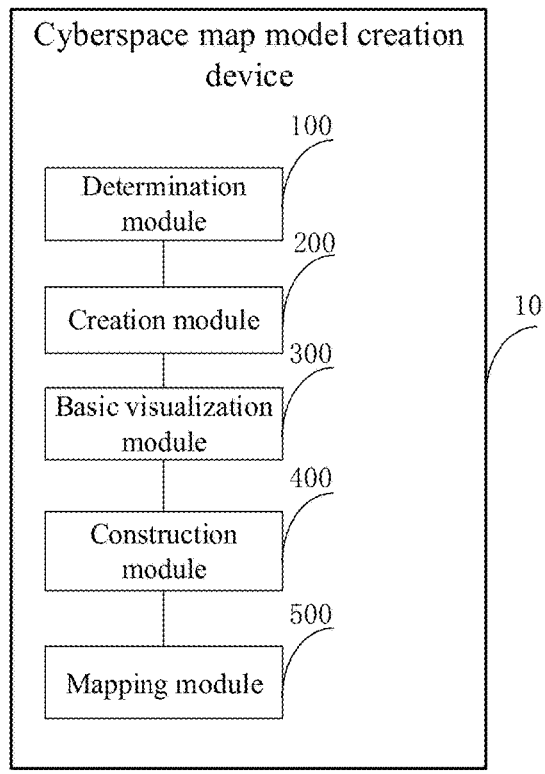

FIG. 6

CYBERSPACE MAP MODEL CREATION METHOD AND DEVICE

CROSS-REFERENCE TO RELATED APPLICATION

The present application is a continuation of International Application No. PCT/CN2019/098874, filed on Aug. 1, 2019, which claims priority to Chinese Patent Application No. 201811467533.5, titled "CYBERSPACE MAP MODEL CREATION METHOD AND DEVICE" and filed by Tsinghua University on Dec. 3, 2018, both of which are hereby incorporated by reference in their entireties.

TECHNICAL FIELD

The present disclosure relates to a field of cyberspace visualization technologies, and more particularly, to a cyberspace map model creation method and device.

BACKGROUND

Cyberspace, as an independent space created by human beings as "God" through combining computer networks and virtual reality, is a digital, information-based, and intelligent virtual world. It has now developed into a second largest space parallel to geographic space and has a profound impact on the social life of human beings. The cyberspace breaks through time and space limitations of traditional physical space. Characteristics of traditional geographic space are less important in the cyberspace. Therefore, there are great differences between the research on cyberspace cartography and the research on traditional geographic cartography. The research on cyberspace cartography is currently almost blank, and the exploration of the origin of the cyberspace is very limited. A basic conceptual model and spatial theoretical foundation have not been established yet, which leads to difficulties in the field of cyberspace map research.

The current research on cyberspace cartography mainly focuses on geographic cyberspace maps and topological cyberspace maps. Spatial characteristics of the cyberspace bring opportunities and challenges to related research in the cyberspace. The research on spatial theoretical models of the cyberspace is centered on geographic cyberspace models and topological cyberspace models. Through a conventional geographic coordinate system and a conventional topological coordinate system, the cyberspace is mapped to a geographic space and a topological space. The geographic cyberspace maps and the topological cyberspace maps realize an expression of geographical and topological characteristics of the cyberspace, but both the geographic cyberspace maps and the topological cyberspace maps have limitations. The geographic cyberspace maps cannot reveal the spatial nature of the cyberspace. Topological nodes of the topological cyberspace maps change dynamically at all times, such that a method for describing and expressing the cyberspace constantly cannot be provided.

However, so far, there is not much research in the field of cyberspace maps. It is difficult to present a number of cyberspace scenes on a unified rendering backplane. It is urgent to solve that no one has proposed a basic cyberspace map model for visualizing the cyberspace.

SUMMARY

The present disclosure aims to solve at least one of the technical problems in the related art to a certain extent.

To this end, an object of the present disclosure is to provide a cyberspace map model creation method, capable of intuitively and effectively visualizing a cyberspace into a cyberspace map, and realizing in-depth analysis and expression of the cyberspace.

Another object of the present disclosure is to provide a cyberspace map model creation device.

To achieve the above objects, an embodiment in one aspect of the present disclosure provides a cyberspace map model creation method. The method includes: step S101: determining that a coordinate system of a cyberspace map model uses an Internet Protocol (IP) address as a basic vector; step S102: mapping the IP address to a two-dimensional coordinate system based on a predetermined mapping mode to create a basic cyberspace map model having aggregation, regionality, and scalability; step S103: determining, by means of orthogonalizing a logical port, a region, a topological structure to the IP address, a three-dimensional coordinate system to describe more fine-grained information of a cyberspace in a concept capable of being abstracted into layers, and obtaining a thematic map of the cyberspace map model; step S104: constructing a scale standard, so as to lay a theoretical foundation for a multi-level and scalable representation of complex and diverse cyberspace resources in the cyberspace map model; and step S105: determining a mapping relationship between a cyberspace map and a geographic map to support screen segmentation, so as to perform a comparison drawing of a same cyberspace scenario in different cyberspace maps and geographic maps, and present cyberspace information in many aspects.

In the cyberspace map model creation method according to an embodiment of the present disclosure, aggregation, regionality and scalability of a map model are satisfied by selecting Hilbert mapping transform, and also, breakthroughs in key technologies of map models such as the construction of a three-dimensional coordinate system, a thematic map, and scale design have been achieved, thereby filling up the vacancy in the cyberspace map model theory. In addition, a multi-scale, multi-dimensional, multi-view cyberspace map device is designed and used in scenarios such as positioning and expression of cyberspace elements, monitoring and management of the cyberspace, and cyberspace security. In this way, the cyberspace can be intuitively and effectively visualized into the cyberspace map, thereby realizing the in-depth analysis and expression of the cyberspace.

In addition, the cyberspace map model creation method according to the above embodiment of the present disclosure may also have the following additional technical features.

Further, in an embodiment of the present disclosure, the coordinate system of the cyberspace map model is a two-dimensional coordinate system. The basic vector is a basis for constructing the two-dimensional coordinate system. Step S102 includes: mapping the basic vector corresponding to the IP address to the two-dimensional coordinate system based on a mapping mode, and maintaining a concept of IP address aggregation, so as to construct a two-dimensional coordinate system of the cyberspace map model having aggregation, regionality, and scalability.

Further, in an embodiment of the present disclosure, the three-dimensional coordinate system includes a third coordinate axis orthogonal to the two-dimensional coordinate system. Step S103 includes: orthogonalizing the third coordinate axis to the two-dimensional coordinate system constructed by the IP address; or abstracting the three-dimensional coordinate system into a concept of layers of a map mode, creating a thematic map of a cyberspace, and visualizing fine-grained IP information.

Further, in an embodiment of the present disclosure, the scale standard is a scaling scale of the cyberspace map model. Each of the cyberspace resources is an entity that is detectable and sensible by using a cyberspace means. Step S104 includes: designing a scale of a cyberspace map with reference to a Geographic Information System (GIS) system to provide the cyberspace map model with a map concept; and presenting different levels of cyberspace resource information by scaling the cyberspace map model. A map under different scaling granularities presents different effects of resource visualization to reflect an original characteristic of the cyberspace.

Further, in an embodiment of the present disclosure, the mapping relationship between the cyberspace map and the geographic map includes mapping between IP addresses of the cyberspace and longitudes and latitudes of a geographic space. Step S105 includes: determining the mapping relationship between the cyberspace map and the geographic map, and expressing a cyberspace element simultaneously in combination with the cyberspace map and the geographic map to observe the cyberspace from a number of angles comprehensively.

To achieve the above objects, an embodiment in another aspect of the present disclosure provides a cyberspace map model creation device. The device includes: a determination module configured to determine that a coordinate system of a cyberspace map model uses an Internet Protocol (IP) address as a basic vector; a creation module configured to map the IP address to a two-dimensional coordinate system based on a predetermined mapping mode to create a basic cyberspace map model having aggregation, regionality, and scalability; a basic visualization module configured to determine, by means of orthogonalizing a logical port, a region, a topological structure to the IP address, a three-dimensional coordinate system to describe more fine-grained information of a cyberspace in a concept capable of being abstracted into layers, and to obtain a thematic map of the cyberspace map model; a construction module configured to construct a scale standard, so as to lay a theoretical foundation for a multi-level and scalable representation of complex and diverse cyberspace resources in the cyberspace map model; and a mapping module configured to determine a mapping relationship between a cyberspace map and a geographic map to support screen segmentation, so as to perform a comparison drawing of a same cyberspace scenario in different cyberspace maps and geographic maps, and present cyberspace information in many aspects.

In the cyberspace map model creation device according to an embodiment of the present disclosure, aggregation, regionality and scalability of a map model are satisfied by selecting Hilbert mapping transform, and also, breakthroughs in key technologies of map models such as construction of a three-dimensional coordinate system, a thematic map, and scale design have been achieved, thereby filling up the vacancy in the cyberspace map model theory. In addition, a multi-scale, multi-dimensional, multi-view cyberspace map device is designed and used in scenarios such as positioning and expression of cyberspace elements, monitoring and management of the cyberspace, and cyberspace security. In this way, the cyberspace can be intuitively and effectively visualized into the cyberspace map, thereby realizing the in-depth analysis and expression of the cyberspace.

In addition, the cyberspace map model creation device according to the above embodiment of the present disclosure may also have the following additional technical features.

Further, in an embodiment of the present disclosure, the coordinate system of the cyberspace map model is a two-dimensional coordinate system. The basic vector is a basis for constructing the two-dimensional coordinate system. The creation module is further configured to map the basic vector corresponding to the IP address to the two-dimensional coordinate system based on a mapping mode, and maintain a concept of IP address aggregation, so as to construct a two-dimensional coordinate system of the cyberspace map model having aggregation, regionality, and scalability.

Further, in an embodiment of the present disclosure, the three-dimensional coordinate system includes a third coordinate axis orthogonal to the two-dimensional coordinate system. The basic visualization module is further configured to: orthogonalize the third coordinate axis to the two-dimensional coordinate system constructed by the IP address; or abstract the three-dimensional coordinate system into a concept of layers of a map mode, create a thematic map of a cyberspace, and visualize fine-grained IP information.

Further, in an embodiment of the present disclosure, the scale standard is a scaling scale of the cyberspace map model. Each of the cyberspace resources is an entity that is detectable and sensible by using a cyberspace means. The construction module is further configured to: design a scale of a cyberspace map with reference to a Geographic Information System (GIS) system to provide the cyberspace map model with a map concept; and present different levels of cyberspace resource information by scaling the cyberspace map model. A map under different scaling granularities presents different effects of resource visualization to reflect an original characteristic of the cyberspace.

Further, in an embodiment of the present disclosure, the mapping relationship between the cyberspace map and the geographic map includes mapping between IP addresses of the cyberspace and longitudes and latitudes of a geographic space. The mapping module is further configured to determine the mapping relationship between the cyberspace map and the geographic map, and express a cyberspace element simultaneously in combination with the cyberspace map and the geographic map to observe the cyberspace from a number of angles comprehensively.

Additional aspects and advantages of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which:

FIG. 5 is a schematic diagram showing a scale standard of a cyberspace map model according to an embodiment of the present disclosure;

FIG. 6 is a block diagram showing a structure of a cyberspace map model creation device according to an embodiment of the present disclosure;

DESCRIPTION OF EMBODIMENTS

Figure 1:
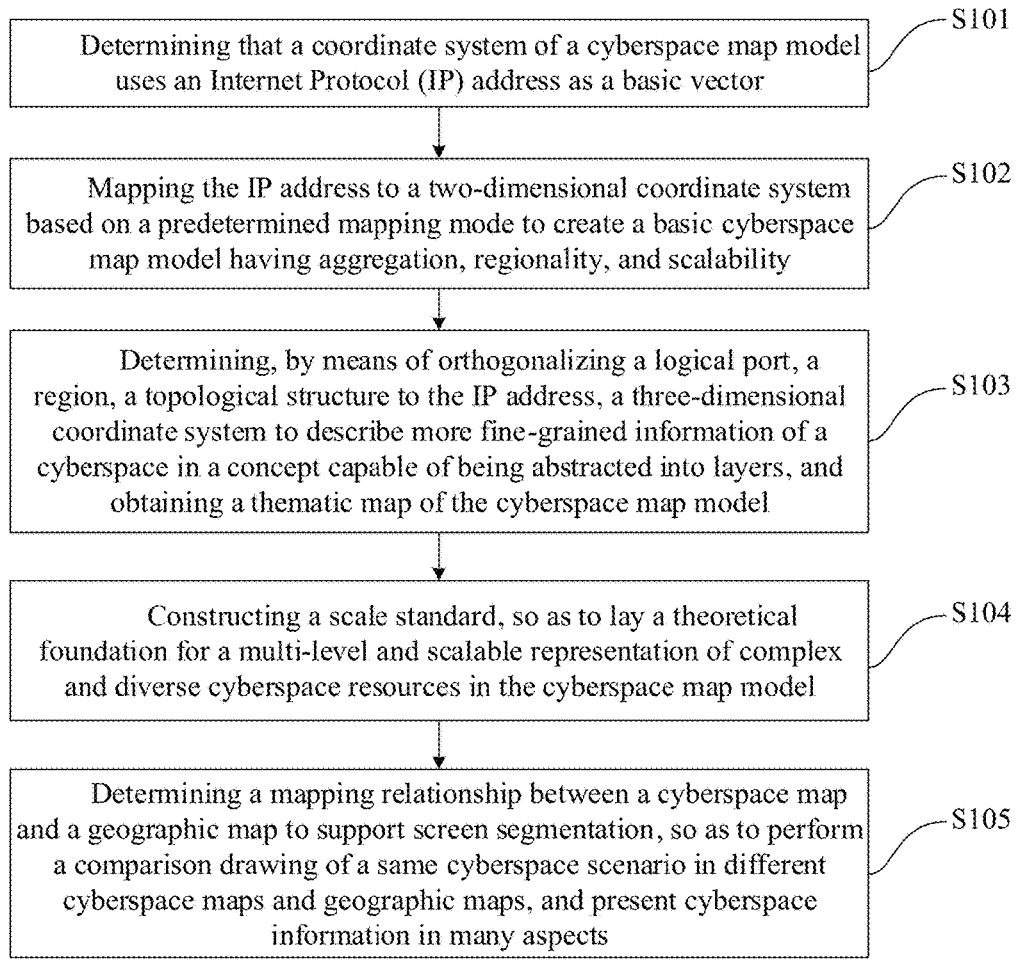
FIG. 1 is a flowchart illustrating a cyberspace map model creation method according to an embodiment of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A cyberspace map model creation method and device according to the embodiments of the present disclosure will be described below with reference to the figures. The cyberspace map model creation method according to the embodiments of the present disclosure will be described first with reference to the figures.

FIG. 1 is a flowchart illustrating a cyberspace map model creation method according to an embodiment of the present disclosure.

As illustrated in FIG. 1, the cyberspace map model creation method includes the following steps.

At step S101, it is determined that a coordinate system of a cyberspace map model uses an Internet Protocol (IP) address as a basic vector.

It can be understood that a coordinate system in a cyberspace map model is a two-dimensional coordinate system, and the basic vector is a basis for constructing the two-dimensional coordinate system. An IP address is used as the basic vector to express an IP-based cyberspace element.

Specifically, a cyberspace is an information processing and interactive environment based on network systems such as the Internet, the Internet of Things, and telecommunications networks, and includes users, services, and data. In the narrow sense, the cyberspace only includes IP-based physical network elements in a general cyberspace. As the only fingerprint for locating a cyberspace element, an IP address is a key identifier for information communication of the cyberspace. In the cyberspace, each of heterogeneous hardware, a heterogeneous operating system, and a heterogeneous network system can realize spatial positioning and spatial information interaction through a unified IP address. That is, an essence of spatial construction of the cyberspace is an IP address. All behaviors and information interactions in the cyberspace need to be implemented based on IP addresses. Taking the IP address as the basic vector of the cyberspace can not only quickly locate the cyberspace element, but also realize circulation of information by constructing a source IP address and a destination IP address. Also, each spatial measurement can be converted directly or indirectly into a measurement of the IP address.

At step S102, the IP address is mapped to a two-dimensional coordinate system based on a predetermined mapping mode to create a basic cyberspace map model having aggregation, regionality, and scalability.

In an embodiment of the present disclosure, the coordinate system of the cyberspace map model is a two-dimensional coordinate system. The basic vector is a basis for constructing the two-dimensional coordinate system. Step S102 includes: mapping the basic vector corresponding to the IP address to the two-dimensional coordinate system based on a mapping mode, and maintaining a concept of IP address aggregation, so as to construct a two-dimensional coordinate system of the cyberspace map model having aggregation, regionality, and scalability.

It can be understood that the cyberspace map model uses the IP address as the basic vector to design the two-dimensional coordinate system. Considering that regionality and scalability of a map cannot be presented satisfyingly due to poor visualization of a one-dimensional IP address space, it is necessary to analyze several mapping methods for dimension upgrading so as to map a one-dimensional IP address to a second-dimensional plane in a cyberspace coordinate system. The Hilbert mapping method can satisfy construction of the basic cyberspace map model having aggregation, regionality, and scalability.

Aggregation means that locality in a one-dimensional space can be maintained in a two-dimensional space, which is very useful for IP addresses. Adjacent IPs being adjacent to each other in the two-dimensional space retains a characteristic of aggregating IPs into blocks, and presents a certain level of regionality of a map. Scalability refers to presenting cyberspace map information with different granularities through changes in orders of different Hilbert curves.

For example, an IP region formed by every 64 grids, such as four IP sub-regions 10.0.0.0/26, 10.0.0.64/26, 10.0.0.128/26, and 10.0.0.192/26, remains adjacent to each other in a cyberspace map of the Hilbert curve with an order N=32. Also, as the order of the Hilbert curve changes, continuous expansion of IP addresses from point to block can be realized. For example, an IP address block of 10.0.0.0/24 is aggregated into one point in a map of a Hilbert curve with an order N=12. When N=13, it is expanded to four points to form a region, and when N=16, the IP block is expanded again to 256 IP addresses, to present the scalability of a map model.

Figure 2:
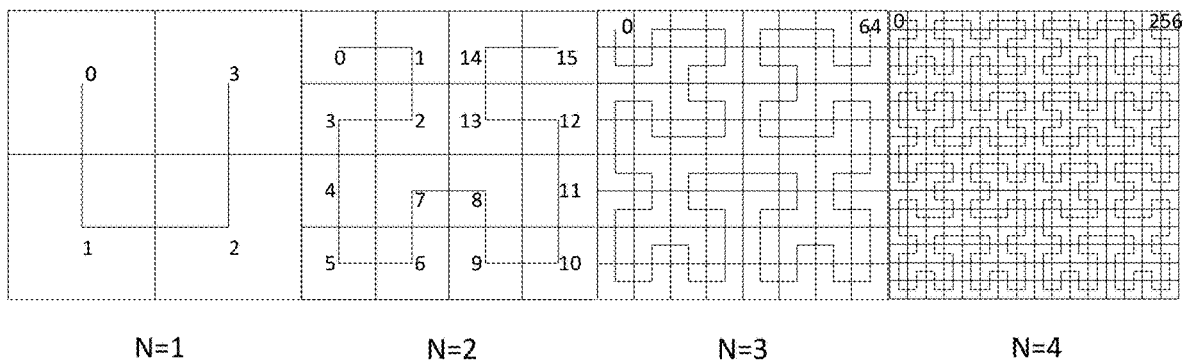
FIG. 2 illustrates a Hilbert Curve of different orders (N=1, 2, 3, 4) according to an embodiment of the present disclosure.

The following will briefly introduce Hilbert mapping, the predetermined mapping mode of mapping the one-dimensional IP address to the two-dimensional coordinate system. A mapping algorithm of the Hilbert mapping is relatively complex. FIG. 2 illustrates Hilbert curves of different orders (N=1, 2, 3, 4). The Hilbert curve is a widely-used space filling curve. For a given quadrant, the drawing method of the Hilbert curve is determined by a position of the quadrant and a curve trend of a large square where the quadrant is located. FIG. 2 illustrates $2^1 \times 2^1$, $2^2 \times 2^2$, $2^3 \times 2^3$, $2^4 \times 2^4$ grids respectively. Each network represents one point. Specific algorithms are as follows.

Algorithm 1: an IP address mapping algorithm based on Hilbert

Input: Hin=<BH,n>Data={0, 1, 2 ... n−1}
where n represents an order of a Hilbert curve, BH=$(h_{2n-1}h_{2n-2} \ldots h_1h_0)_2$ is a binary representation of the IP address
Output: Hout=<x,y>
1. <$v_0,v_1$>=ROTCHANGEN(Hin,0)
2. for (eachnum k∈Data) do
3. $x_k = (v_{0,k} \times (\sim h_{2k})) \oplus v_{1,k} \oplus h_{2k+1}$.
4. $y_k = (v_{0,k} + h_{2k}) \oplus v_{1,k} \oplus h_{2k+1}$
5. end for
6. Hout=<x,y>=<$(x_{n-1}x_{n-2} \ldots x_0)_2, (y_{n-1}y_{n-2} \ldots y_0)_2$>
7. emitHout An algorithm flow of the main functional function ROTCHANGEN is described as follows, and a return value is used as an important parameter for IP mapping transform.

Algorithm 2. ROTCHANGEN

Input: Hin=<BH,n>, BH=$(h_{2n-1}h_{2n-2} \ldots h_1h_0)_2$, a start order k
Output: Hout=<$v_0,v_1$>
1. If k==n
2. $v_{0,n-1}=0$, $v_{1,n-1}=0$
3. end if k==n
4. else
5. ROTCHANGE (Hin,k+1)
6. $v_{0,k} = v_{0,k+1} \oplus h_{2k} \oplus \sim h_{2k+1}$
7. $v_{1,k} = v_{1,k+1} \oplus ((\sim h_{2k}) \times (\sim h_{2k+1}))$
8. End
9. Hout=<$v_{0,n-1}v_{0,n-2} \ldots v_{0,0}, v_{1,n-1}v_{1,n-2} \ldots v_{1,0}$>
10. Emit Hout Since there are a total of $2^{2}=2^{16} \times 2^{16}$ points in an IPv4 address space, to visualize all IP addresses in the two-dimensional space, a 16th-order Hilbert curve is required for display, and a canvas size is $2^{16} \times 2^{16}$. Based on this design, the cyberspace map can well present concepts of the regionality of the map and the scalability.

Figure 3:
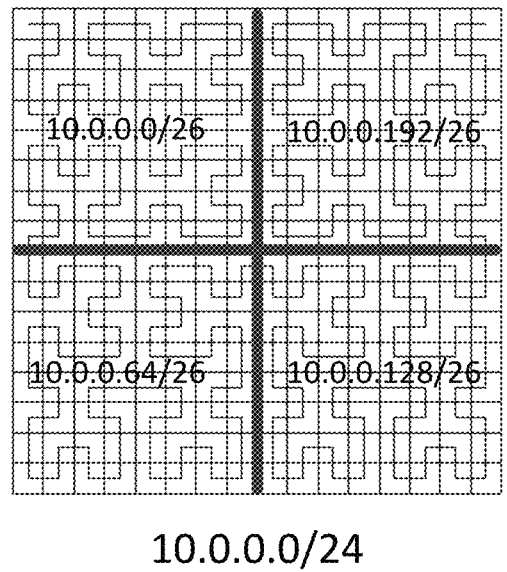
FIG. 3 is a schematic diagram showing a two-dimensional IP address space obtained by performing Hilbert transform on a part of a one-dimensional IP address space according to an embodiment of the present disclosure.

Further, FIG. 3 illustrates a two-dimensional IP address space obtained by performing the Hilbert transform on a part of a one-dimensional IP address space (an IP address block of 10.0.0.0/24). It is observed that one-dimensional IP addresses remain adjacent to each other in the two-dimensional space. Also, a region composed of 64 grids forms an IP prefix aggregation. The four /26 regions are again aggregated into a /24-prefix address space, which reflects the aggregation and the regionality of the cyberspace map model. In addition, by adjusting the order of the Hilbert curve, the continuous expansion of the IP addresses from point to block can be realized, thereby presenting the scalability of the map model, and presenting a good visualization effect.

At step S103, a three-dimensional coordinate system is determined, by means of orthogonalizing a logical port, a region, a topological structure to the IP address, to describe more fine-grained information of a cyberspace in a concept capable of being abstracted into layers, and a thematic map of the cyberspace map model is obtained.

Further, in an embodiment of the present disclosure, the three-dimensional coordinate system includes a third coordinate axis orthogonal to the two-dimensional coordinate system. Step S102 includes: orthogonalizing the third coordinate axis to the two-dimensional coordinate system constructed by the IP address; or abstracting the three-dimensional coordinate system into a concept of layers of a map mode, creating a thematic map of a cyberspace, and visualizing fine-grained IP information.

It can be understood that the three-dimensional coordinate system includes a third coordinate axis orthogonal to the two-dimensional coordinate system. In an embodiment of the present disclosure, the third coordinate axis of the meaning of the logical port, the region, the topological structure, etc., is orthogonal to the two-dimensional coordinate system constructed by the IP address; or, the three-dimensional coordinate system is abstracted as a concept of a map model layer to establish a thematic map of the cyberspace, thereby visualizing the fine-grained IP information such as cyberspace traffic, topology, AS, a network, and an attribute.

Specifically, the two-dimensional coordinate system constructed with the IP address as the basic vector presents an IP attribute of the cyberspace. The cyberspace can be located to a corresponding host granularity, such as a mobile phone, a computer, a PAD, a router, etc. Also, in order to describe and locate cyberspace resources in a more fine-grained manner, the cyberspace map model provided by the present disclosure defines several concepts of three-dimensional coordinate vectors, such as the logical port, the topological structure, regional information, etc., which are orthogonal to the IP address to assist in deeper understanding of the cyberspace. In addition, the thematic map is realized by abstracting the several concepts of three-dimensional coordinate vectors into concepts of layers in the cyberspace map model.

Specifically, the logical port in the cyberspace usually represents a process or a network service. The logical port is orthogonal to an IP address to form a three-dimensional coordinate system that allows fine-grained location of service information related to the cyberspace, such as a website, an email, and ftp. Port flow information can assist in an execution of network monitoring tasks and data forensics related to network security, so as to realize monitoring of flow abnormalities.

In a visualization process, by adding a topological dimension on a basis of the two-dimensional cyberspace map, visualization of a network topology at different granularities can be realized, for example, an Autonomous System (AS) topology, a routing topology, and an IP topology, which is used to guide changes to connectivity of Internet infrastructure in an event of a network security attack, and assist network managers in checking hardware configurations, determining a position to add a new router, and finding bottlenecks and faults in the network. Compared with a topological coordinate system, the network topology is more stable.

Visualization of regional information such as an AS, a metropolitan area network, a local area network, an institution, an organization, etc., based on needs of different levels of network management parties (a nation, an operator, a municipal public security bureau, a campus network, etc.) and existing cyberspace data facilitates corresponding asset management as well as operation and maintenance.

In an embodiment of the present disclosure, a concept of a third-dimensional coordinate vector is abstracted into a layer such as a port, traffic, a topology, a region, etc., thereby drawing the thematic map for the cyberspace. On a basis of the two-dimensional cyberspace coordinate system with IP as the backplane, the cyberspace map is endowed with a specific application scenario by adding a layer, thereby realizing diversified display of the cyberspace.

Figure 4:
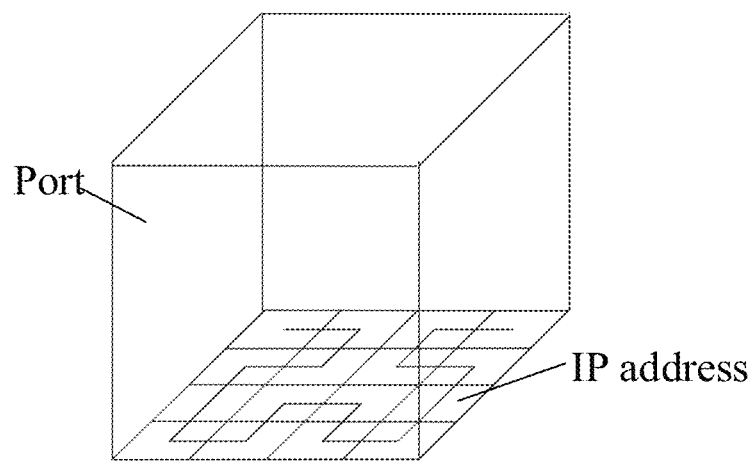
FIG. 4 is a cyberspace map model with a logical port as a third dimension of a coordinate system according to an embodiment of the present disclosure.

For example, the logical port is used as a third dimension of the coordinate system. IP:PORT can be expressed by coordinates (x, y, z) in the cyberspace coordinate system to visualize a service on a host with a more fine-grained granularity. FIG. 4 is a cyberspace map model with a logical port as a third dimension of a coordinate system. As illustrated in FIG. 4, the IP address corresponds to a two-dimensional plane space at a bottom of the three-dimensional coordinate system, and the logical port corresponds to a vertical space of the three-dimensional coordinate system, thereby realizing a better visualization of the cyberspace into the three-dimensional coordinate system.

Or a logical port layer, e.g., an 80 port, is added to the basic cyberspace map. Coloring display of the IP address of the 80 port is opened to facilitate an observation of a distribution of IP addresses implementing the hypertext transfer protocol, thereby realizing visualization of the thematic map of the cyberspace using a hypertext protocol service.

At step S104, a scale standard is constructed, so as to lay a theoretical foundation for a multi-level and scalable representation of complex and diverse cyberspace resources in the cyberspace map model.

In an embodiment of the present disclosure, the scale standard is a scaling scale of the cyberspace map model. Each of the cyberspace resources is an entity that is detectable and sensible by using a cyberspace means. Step S104 includes: designing a scale of a cyberspace map with reference to a Geographic Information System (GIS) system to provide the cyberspace map model with a map concept; and presenting different levels of cyberspace resource information by scaling the cyberspace map model. A map under different scaling granularities presents different effects of resource visualization to reflect an original characteristic of the cyberspace.

Specifically, if all cyberspace resources are displayed indiscriminately during a map model construction process, the cyberspace map will lack intuitiveness, a sense of levels, and logical expression, which is not conducive to network resource management and network security analysis. Therefore, it is urgent to construct the scale standard of the cyberspace map model, such that different levels of cyberspace resources can be scaled and represented under different scales of the cyberspace map model.

FIG. 5 is a schematic diagram showing a scale standard of a cyberspace map model. As illustrated in FIG. 5, preliminary design of a map scale is carried out with reference to the GIS, such that the cyberspace map model is provided with the map concept. Maps having different scaling granularities, that is, Hilbert curves with different orders, present different resource visualization effects.

For example, an initial scale of the cyberspace map model is /20, and an order of the Hilbert curve for drawing the IP address is N=10. AS information in the cyberspace is visualized. Information of a wide area network under the AS is scaled up. The wide area network is expanded into several local area networks. The local area networks are expanded to display specific resource categories (a switch, a router, etc.) of IP granularities. The design of the scale standard enables multi-layer, intuitive and logical expression of the cyberspace map.

In summary, with the cyberspace map model creation method according to an embodiment, it is determined that a coordinate system of a cyberspace map model uses an IP address as a basic vector. The IP address is mapped to a two-dimensional coordinate system based on a predetermined mapping mode to create a basic cyberspace map model having aggregation, regionality, and scalability. A three-dimensional coordinate system is determined, by means of orthogonalizing a logical port, a region, a topological structure to the IP address, to describe more fine-grained information of a cyberspace in a concept capable of being abstracted into layers, and a thematic map of the cyberspace map model is obtained. A scale standard is constructed, so as to lay a theoretical foundation for a multi-level and scalable representation of complex and diverse cyberspace resources in the cyberspace map model.

The method uses constant and orthogonal coordinate system architecture of the cyberspace map model that takes the IP address as the basic vector, thereby realizing accurate expression of cyberspace elements. Compared with the geographic cyberspace map and the topological cyberspace map, the method can visualize unique attributes of the cyberspace more intuitively, comprehensively, and effectively. Dimension upgrading based on the Hilbert mapping transform can realize a better visualization effect of the IP address, thereby satisfying the aggregation, the regionality and the scalability of the two-dimensional coordinate system of the map model.

On this basis, a concept of the third dimension of the coordinate system such as the logical port, the region, and the topological structure is added, and is orthogonal to the IP address to assist in a deeper understanding of the cyberspace. Also, concepts that are abstracted into layers in the cyberspace map model realize diversified thematic maps. In addition, the present disclosure also carries out corresponding design of the scale standard, so as to display complex and diverse resources in the cyberspace that have different granularities in different levels, and present a scalable visualization effect of the map. As the basic support of the cyberspace map, the method can assist in creating a multi-scale, multi-dimensional, and multi-view cyberspace map, thereby promoting the development of visualization of the cyberspace.

On the basis of the above embodiment, the method according to an embodiment of the present disclosure further includes step 105.

At step S105, a mapping relationship between a cyberspace map and a geographic map is determined to support screen segmentation, so as to perform a comparison drawing of a same cyberspace scenario in different cyberspace maps and geographic maps, and present cyberspace information in many aspects.

In an embodiment of the present disclosure, the mapping relationship between the cyberspace map and the geographic map includes mapping between IP addresses of the cyberspace and longitudes and latitudes of a geographic space. Step S105 includes: determining the mapping relationship between the cyberspace map and the geographic map, and expressing a cyberspace element simultaneously in combination with the cyberspace map and the geographic map to observe the cyberspace from a number of angles comprehensively.

It can be understood that, according to an embodiment of the present disclosure, the mapping relationship between the cyberspace map and the geographic map is determined, and the cyberspace element is expressed simultaneously in combination with the cyberspace map and the geographic map, thereby providing a method for comprehensively observing the cyberspace from different angles.

Specifically, according to an embodiment of the present disclosure, a drawing backplane of the cyberspace map model is changed to a geographic map space, and compared with a cyberspace map system provided with a corresponding function, such that screen segmentation is supported in the same scene. The cyberspace map is displayed on the left and the geographic map is displayed on the right. The two kinds of map assistance can help a user to recognize the cyberspace from different angles, and can also reflect advantages of the cyberspace map designed by the present disclosure through comparisons of some scenes.

In summary, the IP address is determined as the basic vector of the coordinate system of the cyberspace map model to visualize the cyberspace from a perspective of the origin of the cyberspace. The virtual nature of the cyberspace, the complexity of spatial structure, and the instantaneity of spatial information have brought great challenges to the construction of the cyberspace coordinate system. As the only fingerprint for locating the cyberspace element, the IP address is a key identifier for information communication of the cyberspace. In the cyberspace, each of heterogeneous hardware, a heterogeneous operating system, and a heterogeneous network system can realize spatial positioning and spatial information interaction through a unified IP address. According to the predetermined mapping mode, the one-dimensional IP address is mapped to the two-dimensional coordinate system to meet the basic cyberspace map model having the aggregation, the regionality and the scalability. Also, researches on key technologies of the cyberspace map model such as three-dimensional coordinate design and scale design are carried out, thereby laying a theoretical foundation for the creation of the thematic map and the multi-level and scalable representation of complex and diverse cyberspace resources in the cyberspace map model. The mapping relationship between the cyberspace map and the geographic map is determined. The cyberspace element is expressed simultaneously in combination with the cyberspace map and the geographic map, thereby providing a method for comprehensively observing the cyberspace from different angles.

Further, according to an embodiment of the present disclosure, a multi-scale, multi-dimensional, multi-view cyberspace map model is designed, which visualizes the cyberspace intuitively and effectively into the cyberspace map, and applies the cyberspace map to scenarios such as expression of cyberspace resources, monitoring and management of the cyberspace element, and visualization of cyberspace security, thereby filling in the vacancy of lack of backplane in the field of cyberspace surveying and mapping, and promoting the development of disciplines in the field of cyberspace surveying and mapping.

With the cyberspace map model creation method according to an embodiment of the present disclosure, the aggregation, the regionality and the scalability of a map model are satisfied by selecting Hilbert mapping transform, and also, breakthroughs in key technologies of map models such as construction of a three-dimensional coordinate system, a thematic map, and scale design have been achieved, thereby filling up the vacancy in the cyberspace map model theory. In addition, a multi-scale, multi-dimensional, multi-view cyberspace map device is designed and used in scenarios such as positioning and expression of cyberspace elements, monitoring and management of the cyberspace, and cyberspace security. In this way, the cyberspace can be intuitively and effectively visualized into the cyberspace map, thereby realizing the in-depth analysis and expression of the cyberspace.

A cyberspace map model creation device according to an embodiment of the present disclosure will be described with reference to the figures.

FIG. 6 is a block diagram showing a structure of a cyberspace map model creation device according to an embodiment of the present disclosure.

As illustrated in FIG. 6, a cyberspace map model creation device 10 includes a determination module 100, a creation module 200, a basic visualization module 300, a construction module 400, and a mapping module 500.

The determination module 100 is configured to determine that a coordinate system of the cyberspace map model uses an Internet Protocol (IP) address as a basic vector. The creation module 200 configured to map the IP address to a two-dimensional coordinate system based on a predetermined mapping mode to create a basic cyberspace map model having aggregation, regionality, and scalability. The basic visualization module 300 is configured to determine, by means of orthogonalizing a logical port, a region, a topological structure to the IP address, a three-dimensional coordinate system to describe more fine-grained information of a cyberspace in a concept capable of being abstracted into layers, and to obtain a thematic map of a cyberspace map model. The construction module 400 is configured to construct a scale standard, so as to lay a theoretical foundation for a multi-level and scalable representation of complex and diverse cyberspace resources in the cyberspace map model. The mapping module 500 configured to determine a mapping relationship between a cyberspace map and a geographic map to support screen segmentation, so as to perform a comparison drawing of a same cyberspace scenario in different cyberspace maps and geographic maps, and present cyberspace information in many aspects. The device 10 according to an embodiment of the present disclosure visualizes the cyberspace intuitively and effectively into the cyberspace map, and realizes the in-depth analysis and expression of the cyberspace.

Specifically, the determination module 100 is configured to determine the cyberspace coordinate system based on the IP address of the cyberspace map model. The creation module 200 is configured to map the IP address to the two-dimensional coordinate system based on the predetermined mapping mode, so as to create coordinate system architecture of the cyberspace map model having the aggregation, the regionality, and the scalability. The basic visualization module 300 is configured to realize materialization of the basic cyberspace map model based on the coordinate system of the cyberspace map model and the scale standard, thereby completing positioning, search and description of massive physical resources. The mapping module 500 is a mapping module for the cyberspace map and the geographic map. The mapping module 500 is configured to support visualization of the screen segmentation in the cyberspace map model, and realize mapping between the cyberspace and the geographic space, thereby presenting the cyberspace information in various aspects. Different modules will be described in detail below.

Further, in an embodiment of the present disclosure, the cyberspace map model coordinate system is a two-dimensional coordinate system. The basic vector is a basis for constructing the two-dimensional coordinate system. The creation module 200 is further configured to map the basic vector corresponding to the IP address to the two-dimensional coordinate system based on a mapping mode, and maintain a concept of IP address aggregation, so as to construct a two-dimensional coordinate system of the cyberspace map model having aggregation, regionality, and scalability.

It can be understood that the creation module 200 is specifically configured to: map the basic vector corresponding to the IP address to the two-dimensional coordinate system based on a mapping mode, and perform the Hilbert transform on the IP address to maintain the concept of IP address aggregation, so as to construct a two-dimensional coordinate system of the cyberspace map model having aggregation, regionality, and scalability.

Further, in an embodiment of the present disclosure, the three-dimensional coordinate system includes a third coordinate axis orthogonal to the two-dimensional coordinate system. The basic visualization module 300 is further configured to: orthogonalize the third coordinate axis to the two-dimensional coordinate system constructed by the IP address; or abstract the three-dimensional coordinate system into a concept of layers of a map mode, create a thematic map of a cyberspace, and visualize fine-grained IP information.

Specifically, the scale standard is a scale design standard of the cyberspace map model. The basic visualization module 300 is specifically configured to materialize the cyberspace map model created based on the construction of the three-dimensional coordinate system, the thematic map, the scale design, etc., and orthogonalize the cyberspace resource, for example, an autonomous domain AS, a network, an organization, an institution, and an attribute, to the IP address as the third dimension of the coordinate system to present fine-grained information of the cyberspace in different levels and at different scales. Or, the basic visualization module 300 is specifically configured to abstract the three-dimensional coordinate system as the concept of the layer of the map model, build the thematic map of the cyberspace, and visualize information such as the autonomous domain AS of the cyberspace, the network, the organization, the institution, and the attribute, such that the two-dimensional coordinate system is constructed based on the IP address, and displayed in different scales.

Figure 7:
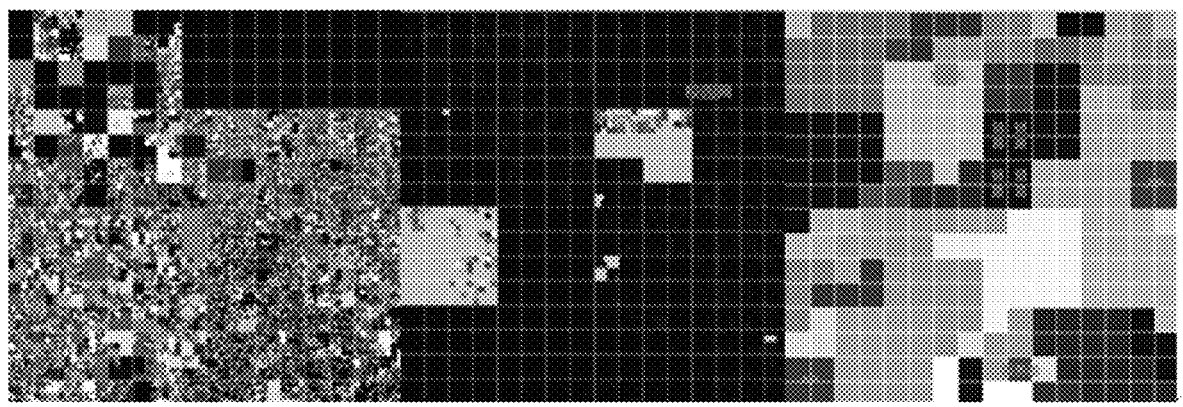
FIG. 7 is a schematic diagram showing a basic visualization module of a cyberspace map according to an embodiment of the present disclosure.

For example, as illustrated in FIG. 7, different colors are used to identify distribution information of ASN and IP address distribution under a scale /20, and AS4538 is expanded under a scale /28 to display a distribution of IPv4 addresses of a backbone network, a computing center, and campus networks of more than one hundred colleges and universities (Wuhan University, Zhengzhou University, Hunan University, Xidian University, etc.) under the Cernet network. The AS4538 is expanded to an IP granularity in the cyberspace map of a scale /32, so as to visualize a corresponding specific resource category identified based on a detection technology of cyberspace resources. Visualization of different types of cyberspace resource under different scales is realized through scaling with reference to the scale design standard of the cyberspace map model creation method. In addition, linking to external codes is supported to meet positioning, searching, and description of the cyberspace for users at different levels.

Further, in an embodiment of the present disclosure, the scale standard is a scaling scale of the cyberspace map model. Each of the cyberspace resources is an entity that is detectable and sensible by using a cyberspace means. The construction module 400 is further configured to: design a scale of a cyberspace map with reference to a GIS system to provide the cyberspace map model with a map concept; and present different levels of cyberspace resource information by scaling the cyberspace map model. A map under different scaling granularities presents different effects of resource visualization to reflect an original characteristic of the cyberspace.

Figure 8:
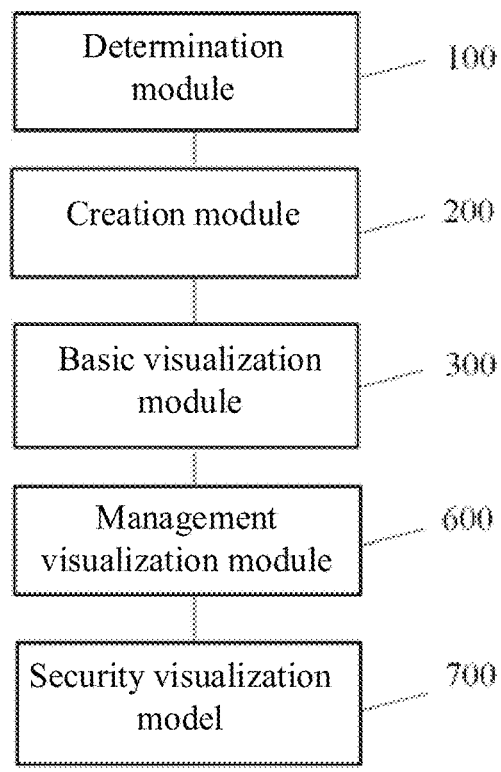
FIG. 8 is a block diagram showing a structure of a cyberspace map model creation device according to another embodiment of the present disclosure.

Further, as illustrated in FIG. 8, the device 10 implemented by the present disclosure further includes a management visualization module 600. The management visualization module 600 is configured to realize visualization of a cyberspace management scene in the map model with IP addresses as the backplane, thereby assisting a management party in more fine-grained asset management.

The cyberspace map model uses the IP addresses as the backplane. The visualization of the cyberspace is visualization of characteristics and attributes of IP addresses in the cyberspace. The management visualization module 600 is specifically configured to: intuitively reflect composition and performance indicators of the IP addresses, and assist a network management party (a nation, an operator, a municipal public security bureau, a campus network, etc.) to perform a corresponding level of asset management and operation maintenance based on the scalability of the map.

Further, the cyberspace map model uses the IP addresses as the backplane. The visualization of the cyberspace is the visualization of the characteristics and attributes of IP addresses in the cyberspace, such that the user is provided with data interface specifications, thereby presenting a corresponding map effect by importing data according to the specifications. The module defines a data format [start IP, end IP, scale, chroma, cyberspace resource category 1, description 1, cyberspace resource category 2, description 2, . . . ].

Further, as illustrated in FIG. 8, the device 10 implemented by the present disclosure further includes a security visualization model 700. The security visualization model 700 is configured to dynamically display scenarios such as security attacks, botnet distribution, and DDOS attacks that exist in the cyberspace in the cyberspace map model in real time, so as to assist security analysts to better understand and defend against attacks.

The security visualization module 700 is specifically configured to dynamically display some existing security attacks, botnet distribution, DDOS attacks and other scenarios in real time, and to visualize a statistical result of data. A security issue can be located quickly, an attack behavior can be analyzed, and a C&C server of the botnet can be positioned, thereby helping security analysts to better understand and defend against attacks.

Figure 9:
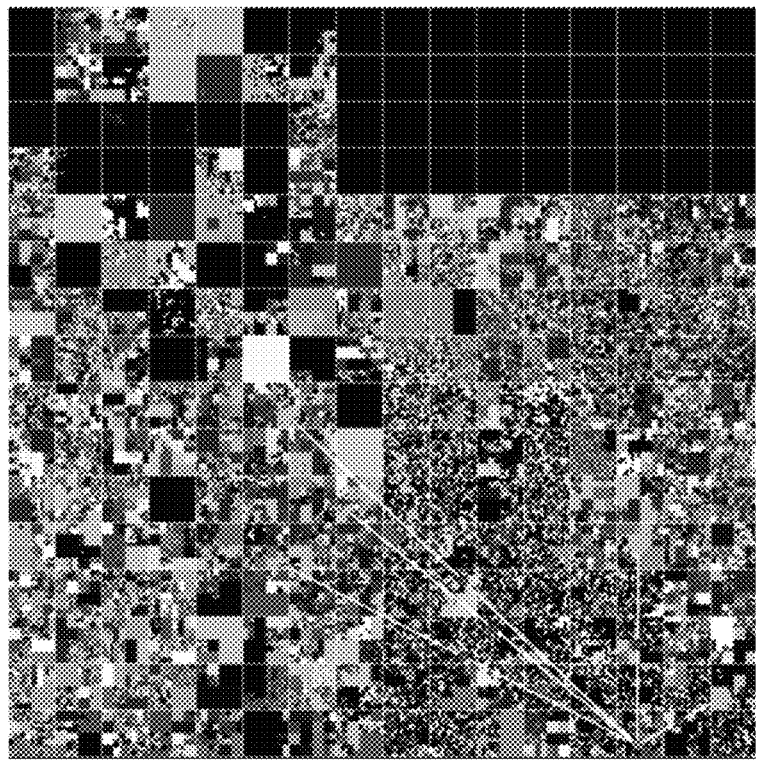
FIG. 9 is a Distributed Denial of Service (DDOS) Attack scenario of a cyberspace map according to an embodiment of the present disclosure.

Further, as illustrated in FIG. 9, a DDOS scenario is visualized in the cyberspace map model with the IP addresses as the backplane, which can intuitively express an expansion of an infected IP and distribution of a DDoS attack IP and an attacked IP address. In this way, security analysts are assisted to better understand and defend against attacks, a transmission path of an infection is cut off effectively, and shielding and prevention of a network attack are realized.

Regarding the device according to the embodiments of the present disclosure, a specific manner in which each module performs the operations has been described in detail in the embodiments of the method, and thus detailed description will be omitted here.

In summary, with the cyberspace map model creation device according to an embodiment of the present disclosure, the cyberspace coordinate system based on the IP address of the cyberspace map model is determined. The IP address is mapped to the two-dimensional coordinate system based on the predetermined mapping mode, so as to create the coordinate system architecture of the cyberspace map model having the aggregation, the regionality, and the scalability. The materialization of the basic cyberspace map model is realized based on the coordinate system of the cyberspace map model and the scale standard, thereby completing positioning, search and description of massive physical resources. The visualization of a cyberspace management scene is realized in the map model with the IP addresses as the backplane, thereby assisting the management party in more fine-grained asset management. Scenarios such as security attacks, botnet distribution, and DDOS attacks that exist in the cyberspace are dynamically displayed in real time in the cyberspace map model, so as to assist security analysts to better understand and defend against attacks. The device uses the constant and orthogonal coordinate system architecture of the cyberspace map model that takes the IP address as the basic vector, thereby realizing accurate expression of cyberspace elements. Compared with the geographic cyberspace map and the topological cyberspace map, the device can visualize unique attributes of the cyberspace more intuitively, comprehensively, and effectively. The dimension upgrading based on the Hilbert mapping transform can realize a better visualization effect of the IP address, thereby satisfying the aggregation, the regionality and the scalability of the two-dimensional coordinate system of the map model.

On the basis, the cyberspace map model is materialized, and classic application scenarios of the cyberspace map are extracted for visualization, thereby realizing drawing and visualization of a number of classic application scenarios such as cyberspace resources, management, security, and measurement. Users can easily filter out details of interest to obtain effective display of different regions under different granularities in the cyberspace, which is convenient for a network user, a management party, and a security analyst to obtain multi-level understanding of the cyberspace, locate a cyberspace resource, understand regional performance of a network, optimize network configuration management, and sense a security situation of the network accurately. Compared with the conventional geographic map and the topological map, the original characteristic of the cyberspace can be better reflected.

Further, on a basis of the above embodiment, the mapping module 500 is a mapping module for the cyberspace map and the geographic map. The mapping module 500 is further configured to support visualization of the screen segmentation in the cyberspace map model, and realize mapping between the cyberspace and the geographic space, thereby presenting the cyberspace information in various aspects.

Further, in an embodiment of the present disclosure, the mapping relationship between the cyberspace map and the geographic map includes mapping between IP addresses of the cyberspace and longitudes and latitudes of a geographic space. The mapping module 500 is further configured to determine the mapping relationship between the cyberspace map and the geographic map, and express a cyberspace element simultaneously in combination with the cyberspace map and the geographic map to observe the cyberspace from a number of angles comprehensively.

It can be understood that realizing the mapping between the cyberspace and the geographic space visually represents the mapping between the IP addresses of the cyberspace and the longitudes and the latitudes of the geographic space. Presenting the cyberspace information from different aspects includes expressing the cyberspace element simultaneously in combination with the cyberspace map and the geographic space map, thereby providing a method for observing the cyberspace comprehensively from different angles.

It is to be noted that the cyberspace map model has a basic concept of map scaling. The predetermined mapping mode is a conversion mode of mapping the one-dimensional IP address to the two-dimensional coordinate system, thereby guaranteeing the aggregation, the regionality and the scalability of the basic coordinate system of the cyberspace map model. The design standard of the scale is scaling of the cyberspace map, so as to realize multi-level visualization of different cyberspace resources at different scales, e.g., from an AS resource, to distribution of a large network (a backbone network, an access network, a stationed map, Internet of Things, an industrial network, an overlay network, etc.) under a certain AS, and to a small network (a campus network, a computing center, a home network, etc.), thereby realizing searching, positioning, and description of more fine-grained IP resources, and reflecting a multi-level structure of the cyberspace.

Figure 10:
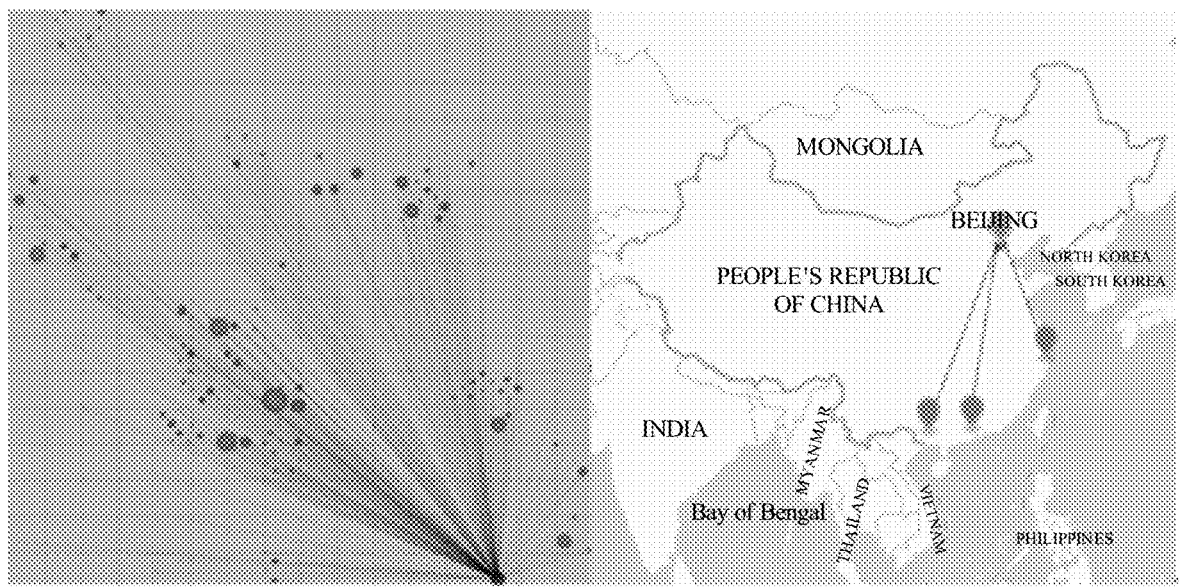
FIG. 10 is a schematic diagram showing a split screen of mapping between a cyberspace map and a geographic map according to an embodiment of the present disclosure.

For example, as illustrated in FIG. 10, one DDOS attack scenario targeted at a host of a campus network server of Tsinghua University is presented. On the left side of the cyberspace map, the AS, a large network, a small network, a subnet, an IP and other levels to which a DDOS attack source and destination belong can be displayed in turn, and a side of the geographic map shows a geographic position of a host at a corresponding level. From geographical distribution characteristics and IP distribution characteristics of a DDOS puppet host, it can be seen that points aggregated in a geographical position may be scattered in the IP map, which can play a role of comparison and supplement.

An embodiment of the present disclosure constructs a multi-scale, multi-dimensional, multi-view cyberspace map device according to the cyberspace map model creation method, and is applied to some classic application scenarios of the cyberspace map, so as to obtain multi-level understanding of the cyberspace.

With the cyberspace map model creation device according to an embodiment of the present disclosure, aggregation, regionality and scalability of a map model are satisfied by selecting Hilbert mapping transform, and also, breakthroughs in key technologies of map models such as construction of a three-dimensional coordinate system, a thematic map, and scale design have been achieved, thereby filling up the vacancy in the cyberspace map model theory. In addition, a multi-scale, multi-dimensional, multi-view cyberspace map device is designed and used in scenarios such as positioning and expression of cyberspace elements, monitoring and management of the cyberspace, and cyberspace security. In this way, the cyberspace can be intuitively and effectively visualized into the cyberspace map, thereby realizing the in-depth analysis and expression of the cyberspace.

In addition, terms such as "first" and "second" are used herein for purposes of description and are not intended to indicate or imply relative importance, or to implicitly show the number of technical features indicated. Thus, a feature defined with "first" and "second" may explicitly or implicitly include one or more this feature. In the description of the present disclosure, "a plurality of" means at least two, for example, two, three, etc., unless specified otherwise.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

Although embodiments of the present disclosure have been shown and described above, it should be understood that above embodiments are just explanatory, and cannot be construed to limit the present disclosure. For those skilled in the art, changes, alternatives, and modifications can be made to the embodiments without departing from the scope of the present disclosure.

What is claimed is:

1. A cyberspace map model creation method, comprising:
step S101: determining that a coordinate system of a cyberspace map model uses an Internet Protocol (IP) address as a basic vector;
step S102: mapping the IP address to a Hilbert curve on a two-dimensional coordinate system based on a Hilbert mapping mode to create a basic cyberspace map model having aggregation, regionality, and scalability;
step S103: determining, by means of orthogonalizing a logical port, a region, a topological structure to the IP address, a three-dimensional coordinate system to describe more fine-grained information of a cyberspace in a concept capable of being abstracted into layers, and obtaining a thematic map of the cyberspace map model, wherein a logical port layer is added to the basic cyberspace map model by coloring display of IP addresses with an opened 80 port to facilitate an observation of a distribution of IP addresses implementing a hypertext transfer protocol;
step S104: constructing a scale standard, so as to lay a theoretical foundation for a multi-level and scalable representation of complex and diverse cyberspace resources in the cyberspace map model, wherein when a cyberspace map is zoomed out with an increased scale, an order of the IP address-mapped Hilbert curve of the Hilbert mapping mode is adjusted low to increase an aggregation level of IP addresses, and when the cyberspace map is zoomed in with a decreased scale, the order of the IP address-mapped Hilbert curve of the Hilbert mapping mode is adjusted high to decrease the aggregation level of the IP addresses: at an initial scale, autonomous system information alone is displayed on the cyberspace map, and as the scale decreases, wide area network information, local area network information, and device information are displayed respectively at different scales; and
step S105: determining a mapping relationship between a cyberspace map and a geographic map to support screen segmentation, so as to perform a side-by-side comparison drawing of a same cyberspace scenario in different cyberspace maps and geographic maps on a same screen, and present cyberspace information in many aspects, wherein, in a distributed denial of service (DDOS) attack scenario, Hilbert curves to which IP addresses of DDOS puppet hosts are mapped are displayed on a cyberspace map, and simultaneously geographic locations of the DDOS puppet hosts are displayed on a geographic map drawn side-by-side on a same screen as the cyberspace map, to distinguish between a distribution of the DDOS puppet hosts in cyberspace and a distribution of the DDOS puppet hosts in geographic space.

2. The method according to claim 1, wherein the coordinate system of the cyberspace map model is a two-dimensional coordinate system, the basic vector is a basis for constructing the two-dimensional coordinate system, and step S102 comprises:
mapping the basic vector corresponding to the IP address to the two-dimensional coordinate system based on a mapping mode, and maintaining a concept of IP address aggregation, so as to construct a two-dimensional coordinate system of the cyberspace map model having aggregation, regionality, and scalability.

3. The method according to claim 2, wherein the three-dimensional coordinate system comprises a third coordinate axis orthogonal to the two-dimensional coordinate system, and step S103 comprises:
orthogonalizing the third coordinate axis to the two-dimensional coordinate system constructed by the IP address; or
abstracting the three-dimensional coordinate system into a concept of layers of a map mode, creating a thematic map of a cyberspace, and visualizing fine-grained IP information.

4. The method according to claim 1, wherein the scale standard is a scaling scale of the cyberspace map model, each of the cyberspace resources is an entity that is detectable and sensible by using a cyberspace means, and step S104 comprises:
designing a scale of a cyberspace map with reference to a Geographic Information System (GIS) system to provide the cyberspace map model with a map concept; and
presenting different levels of cyberspace resource information by scaling the cyberspace map model, wherein a map under different scaling granularities presents different effects of resource visualization to reflect an original characteristic of the cyberspace.

5. The method according to claim 1, wherein the mapping relationship between the cyberspace map and the geographic map comprises mapping between IP addresses of the cyberspace and longitudes and latitudes of a geographic space, and step S105 comprises:
determining the mapping relationship between the cyberspace map and the geographic map, and expressing a cyberspace element simultaneously in combination with the cyberspace map and the geographic map to observe the cyberspace from a number of angles comprehensively.

6. A cyberspace map model creation device, comprising a memory and a processor, the memory having a computer program stored therein, and the processor being configured to execute the computer program to perform:
step S101: determining that a coordinate system of a cyberspace map model uses an Internet Protocol (IP) address as a basic vector;
step S102: mapping the IP address to a Hilbert curve on a two-dimensional coordinate system based on a Hilbert mapping mode to create a basic cyberspace map model having aggregation, regionality, and scalability;
step S103: determining, by means of orthogonalizing a logical port, a region, a topological structure to the IP address, a three-dimensional coordinate system to describe more fine-grained information of a cyberspace in a concept capable of being abstracted into layers, and to obtain a thematic map of the cyberspace map model, wherein a logical port layer is added to the basic cyberspace map model by coloring display of IP addresses with an opened 80 port to facilitate an observation of a distribution of IP addresses implementing a hypertext transfer protocol;

step S104: constructing a scale standard, so as to lay a theoretical foundation for a multi-level and scalable representation of complex and diverse cyberspace resources in the cyberspace map model, wherein when a cyberspace map is zoomed out with a reduced scaling factor, an order of the IP address-mapped Hilbert curve of the Hilbert mapping mode is adjusted high to increase an aggregation level of IP addresses, and when the cyberspace map is zoomed in with an increased scaling factor, the order of the IP address-mapped Hilbert curve of the Hilbert mapping mode is adjusted low to decrease the aggregation level of the IP addresses; at an initial scale, autonomous system information alone is displayed on the cyberspace map, and as the scale decreases, wide area network information, local area network information, and device information are displayed respectively at different scales; and step S105: determining a mapping relationship between a cyberspace map and a geographic map to support screen segmentation, so as to perform a side-by-side comparison drawing of a same cyberspace scenario in different cyberspace maps and geographic maps on a same screen, and present cyberspace information in many aspects, wherein, in a distributed denial of service (DDOS) attack scenario, Hilbert curves to which IP addresses of DDOS puppet hosts are mapped are displayed on a cyberspace map, and simultaneously geographic locations of the DDOS puppet hosts are displayed on a geographic map drawn side-by-side on a same screen as the cyberspace map, to distinguish between a distribution of the DDOS puppet hosts in cyberspace and a distribution of the DDOS puppet hosts in geographic space.

7. The device according to claim 6, wherein the coordinate system of the cyberspace map model is a two-dimensional coordinate system, the basic vector is a basis for constructing the two-dimensional coordinate system, and step S102 comprises mapping the basic vector corresponding to the IP address to the two-dimensional coordinate system based on a mapping mode, and maintaining a concept of IP address aggregation, so as to construct a two-dimensional coordinate system of the cyberspace map model having aggregation, regionality, and scalability.

8. The device according to claim 7, wherein the three-dimensional coordinate system comprises a third coordinate axis orthogonal to the two-dimensional coordinate system, and step S103 comprises orthogonalizing the third coordinate axis to the two-dimensional coordinate system constructed by the IP address; or abstracting the three-dimensional coordinate system into a concept of layers of a map mode, creating a thematic map of a cyberspace, and visualizing fine-grained IP information.

9. The device according to claim 6, wherein the scale standard is a scaling scale of the cyberspace map model, each of the cyberspace resources is an entity that is detectable and sensible by using a cyberspace means, and step S104 comprises designing a scale of a cyberspace map with reference to a Geographic Information System (GIS) system to provide the cyberspace map model with a map concept; and presenting different levels of cyberspace resource information by scaling the cyberspace map model, wherein a map under different scaling granularities presents different effects of resource visualization to reflect an original characteristic of the cyberspace.

10. The device according to claim 6, wherein the mapping relationship between the cyberspace map and the geographic map comprises mapping between IP addresses of the cyberspace and longitudes and latitudes of a geographic space, and step S105 comprises determining the mapping relationship between the cyberspace map and the geographic map, and expressing a cyberspace element simultaneously in combination with the cyberspace map and the geographic map to observe the cyberspace from a number of angles comprehensively.

* * * * *